United States Patent [19]
Tesone

[11] 3,858,301
[45] Jan. 7, 1975

[54] TOOL FOR REMOVING WINDSHIELD MOLDINGS

[76] Inventor: Abelardo A. Tesone, 60-11 Broadway, Woodside, N.Y. 11377

[22] Filed: Apr. 10, 1974

[21] Appl. No.: 459,787

[52] U.S. Cl. ............................................. 29/278
[51] Int. Cl. .......................................... B25b 27/00
[58] Field of Search ............ 29/253, 267, 270, 278; 81/3 R, 3.46 A, 3.46 R, 3.47; 254/120, 131

[56] References Cited
UNITED STATES PATENTS

| 2,148,213 | 2/1939 | Lyon | 29/267 |
| 3,508,319 | 4/1970 | Boyer | 29/235 |
| 3,751,785 | 8/1973 | Whitesell | 29/267 |

FOREIGN PATENTS OR APPLICATIONS

| 163,087 | 10/1948 | Germany | 254/131 |

*Primary Examiner*—Donald G. Kelly
*Assistant Examiner*—Harold P. Smith, Jr.
*Attorney, Agent, or Firm*—Amster & Rothstein

[57] ABSTRACT

A tool for removing molding strips from around the windshield of an automobile by releasing the fasteners which attach the molding strips to the frame of the automobile. The tool includes a handle and an L-shaped member having first and second sections which lie in substantially perpendicular planes. The second section includes a working edge which is tapered so that when the tool is moved laterally in the direction of the axis of the molding strips, the tapered working edge will engage and force the fasteners away from the frame to disengage the fasteners and the molding strips so that the molding strips may be removed.

4 Claims, 11 Drawing Figures

Patented Jan. 7, 1975 3,858,301
2 Sheets-Sheet 1
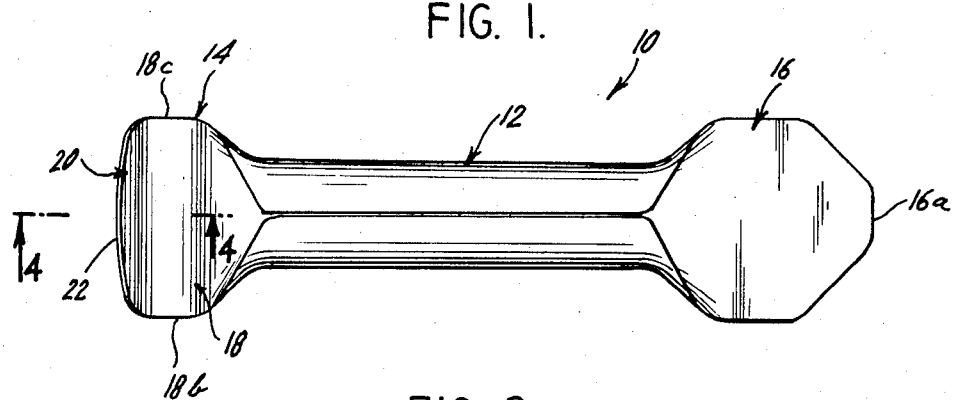
FIG. 1.
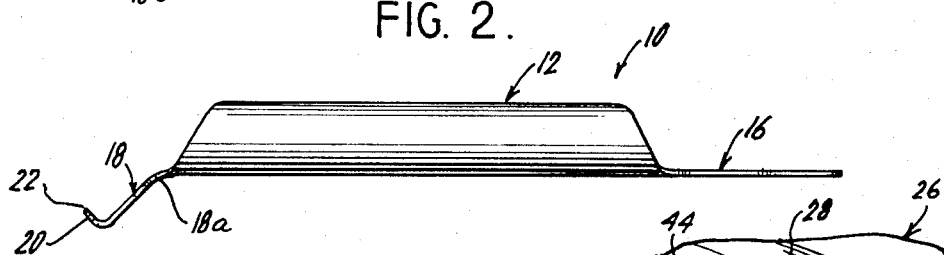
FIG. 2.
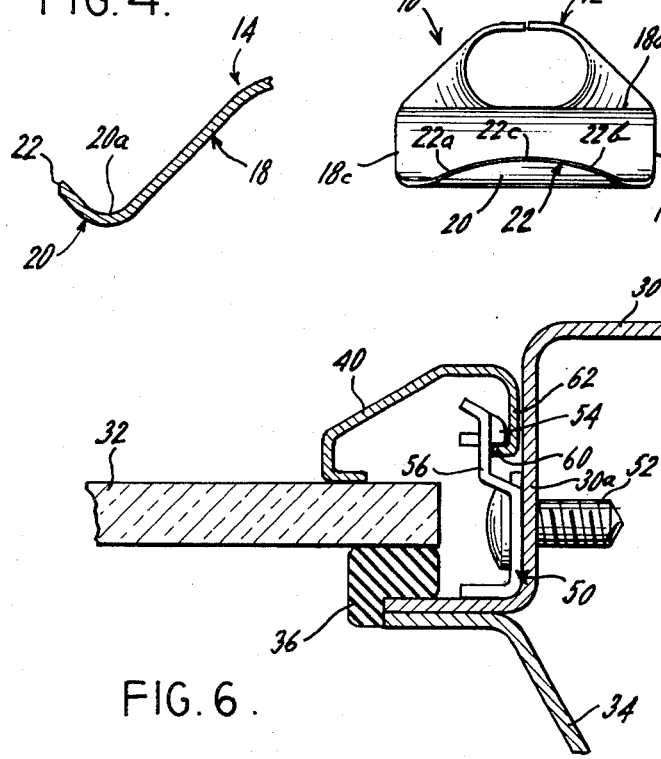
FIG. 3.
FIG. 4.
FIG. 6.
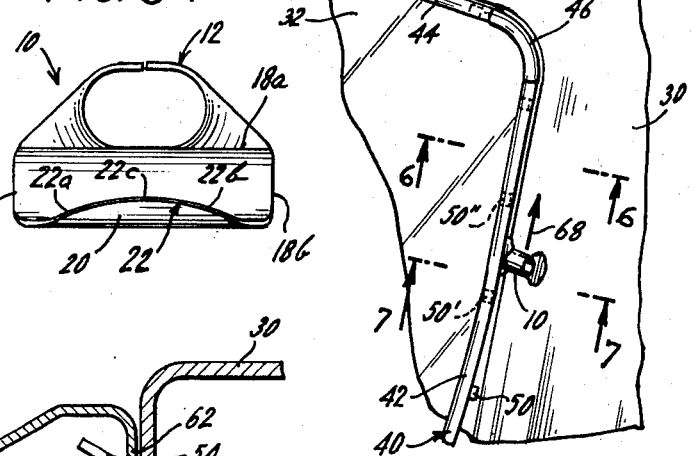
FIG. 5.

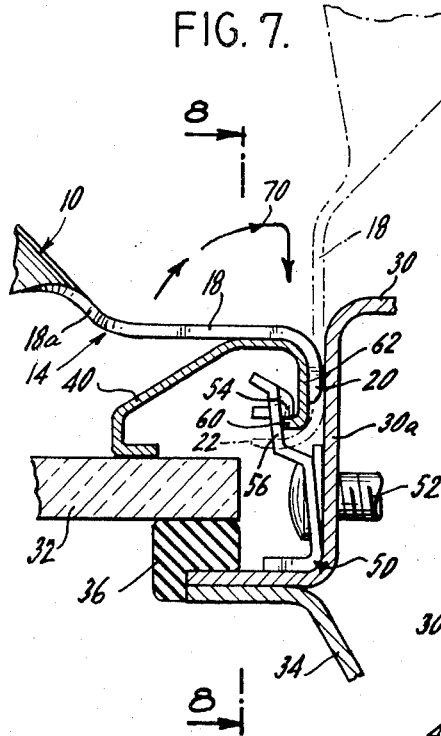
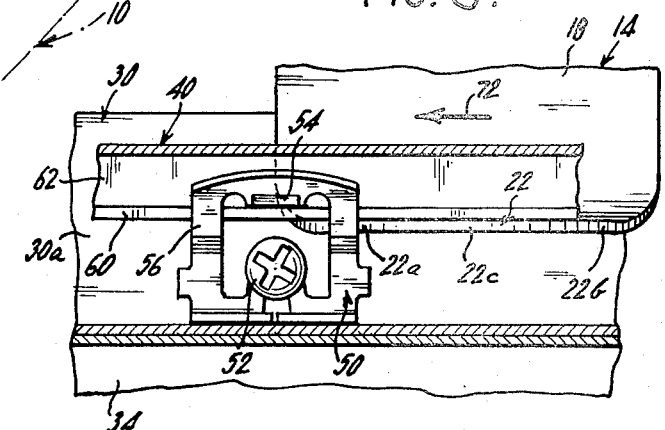
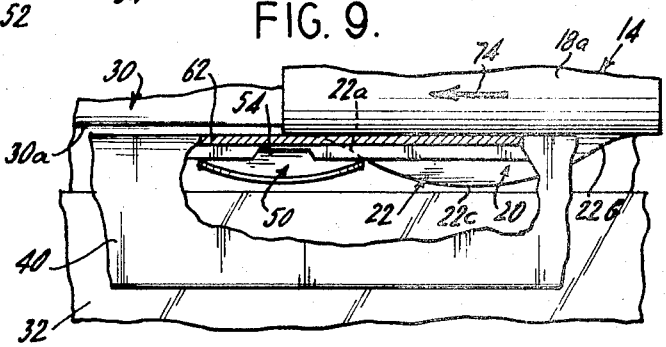
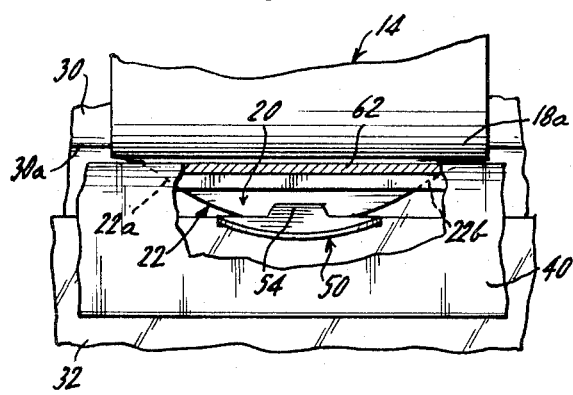
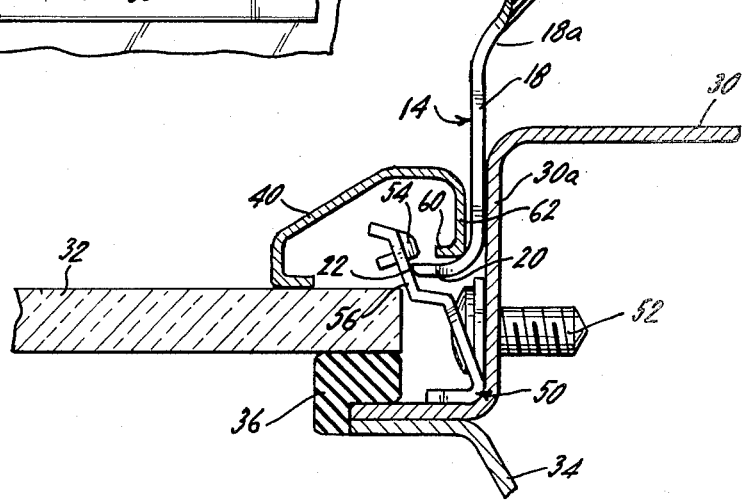

TOOL FOR REMOVING WINDSHIELD MOLDINGS

The present invention relates generally to special purpose tools and, in particular, to a tool for removing molding strips from around the windshield and rear window of an automobile.

When performing automobile body work, such as repairing structural damage, painting, or the like, it is often necessary or desirable to remove the metal molding strips from around the windshield or rear window of the automobile. Removal of the molding facilitates painting, and permits removal of the window glass if it should be necessary. Such molding strips are conventionally held tightly in place by a plurality of spaced clip fasteners which are secured to the window frame of the automobile. As is well known, these fasteners are formed of spring metal and with a small shoulder or protrusion which snaps over the inner edge of the molding strip to hold it in place between the automobile body and windshield. In order to remove the molding strip, it is necessary to force the spring clip fastener away from the automobile frame surrounding the windshield, thereby releasing the inner edge of the molding strip and allowing it to be removed. Since the spring clip fasteners securing the molding strips must be quite strong in order to prevent the molding from vibrating out of position, release of the molding strip becomes a difficult and time-consuming task.

Although such special purpose tools have been developed in the past, they have not been completely satisfactory. For example, U.S. Pat. No. 3,751,785 discloses such a tool for removing moldings. The tool disclosed in this patent includes an elongated metal blade and a semicircular or arcuate tip portion which is intended to function as a fulcrum about which the tool may pivot. The terminal edge of the arcuate tip portion remote from its connection to the blade is adapted to be inserted between the molding strip and the automobile window frame. The aforesaid patent further discloses that the handle for the tool may carry a foldout located blade which may be inserted under the molding and moved along the surface of the glass to locate the spring clip fasteners. More particularly, each time a fastener is located with the locator blade, the tool is then turned around so that the arcuate tip portion may be inserted between the molding strip and the automobile window frame. The aforesaid patent also discloses that the arcuate tip portion must be inserted so that it will extend beyond the molding strip sufficiently far such that when the tool handle is pivoted upwardly away from the glass, the exterior surface of the arcuate tip portion will rock on the body metal work. The prior art patent also states that if the tool has been properly located over one of the fasteners, rotation of the tool will cause the terminal edge to force the spring clip fastener away from the molding and will thereby release the molding strip from the fastener.

However, it has been found that the prior art tool described in U.S. Pat. No. 3,751,785 does not function to release the molding strips from the fasteners. More particularly, assume that the locator blade has been used to locate a spring clip fastener and that the tool has been inserted between the molding strip and the automobile window frame so that the arcuate tip portion extends behind the molding. In operation, when the tool handle is pivoted upwardly and away from the glass, the arcuate tip portion does not operate to disengage the spring clip from the inner edge of the molding. Apparently, the tool cannot be pivoted a sufficient distance to have the terminal edge engage the spring clip and force it out of contact with the molding strip. To the extent that the tool does pivot, it operates to move the molding strip and spring clip together so that the elements are not separated. In addition, a further objection to the tool described in U.S. Pat. No. 3,751,785 is that each spring clip fastener must be located before the tool can even be inserted in an attempt to release the molding strip from the spring clip. As there are a large number of spring clips holding the molding strips in place, it will be apparent that such an operation of locating each spring clip before it can be removed is not only time-consuming, but is also cumbersome. Accordingly, it would be desirable to provide such a special purpose tool which would release the spring clip fasteners from the molding strips in one continuous operation without the need for first locating and then removing each spring clip fastener separately.

Accordingly, it is an overall object of the present invention to provide a special purpose tool which realizes one or more of the aforesaid objectives. In its commercial form, the tool is of relatively simple construction, is readily manufactured by mass production techniques at relatively low cost and is relatively indestructible.

It is also an object of the present invention to provide a tool which may be used to quickly and easily remove windshield moldings from automobiles in a continuous operation without the need for first locating each of the spaced fasteners.

It is a further object of the present invention to provide a tool which may be used to release the spring clip fasteners holding the molding strips in place without damaging either the molding strip or the windshield or the spring clips.

It is a still further object of the present invention to provide a molding release tool for disengaging the spring clips from the molding strips which they secure, the tool being adapted to fit between the molding strip and the window frame, whereby a continuous lateral motion of the tool along the molding strip will automatically release the successive spring clips from the molding strip, thereby removing the molding strip from the windshield.

In accordance with an illustrative embodiment demonstrating the principles of the present invention, a tool is provided for removing molding strips from around the windshield of an automobile wherein the molding strips are attached to the frame surrounding the windshield by means of a plurality of spaced spring clip fasteners. The tool includes a handle and an L-shaped member having first and second sections which lie in substantially perpendicular planes. The second section includes a working edge which is tapered so that when the tool is moved laterally in the direction of the axis of the molding strips, the tapered working edge engages and forces the fasteners away from the frame to disengage the fasteners and the molding strips so that the molding strips may be removed. The second section of the tool is relatively thin so that it may be inserted and wedged between the window frame and the molding strip and in this insertion position the first section of the tool is substantially parallel to the windshield. From this insertion position, the tool is pivoted approximately 90° to an operating position in which the second section of the tool is in engagement with or closely adjacent to the inwardly extending edge of the molding strip, which edge is in engagement with a shoulder of the spring clip fastener. With the tool in the operating position, it is moved laterally in the direction of the molding strips so that the tapered working edge of the tool engages and gradually forces the spring clip away from the window frame. In this manner, the shoulder of the spring clip is moved out of engagement with the inwardly extending edge of the molding strip so that the molding strip is thereby released and may be easily removed from engagement with the windshield. As the tool's lateral movement is continued, it operates to automatically release successive spring clips so that the molding strips may be removed in a continuous operation.

Advantageously, this tool construction provides several advantages over prior art devices. First, with the tool of the present invention there is no need to first determine the location of each spring clip fastener before it may be released. As there are a large number of such spring clips holding the molding strips in place, it will be apparent that the elimination of this step saves a great deal of the time involved in the conventional process of removing the molding strips. Second, once the tool is pivoted from its insertion position to its operating position, only a continuous lateral movement of the tool in the direction of the molding strips is required to automatically release the successive spring clip fasteners from the molding strips so that the molding strips may be removed in a continuous operation.

The above description as well as further objects, features and advantages of the present invention will be more fully understood upon consideration of the following detailed description of a presently preferred, but nonetheless illustrative embodiment in accordance with the present invention, when taken in conjunction with the accompanying drawings, wherein:

FIG. 1 is a top plan view of the tool of the present invention;

FIG. 2 is an elevational view of one side of the tool of the present invention;

FIG. 3 is a front elevational view looking from the left in FIG. 1 illustrating in detail the tapered working edge of the tool of the present invention;

FIG. 4 is an enlarged cross-sectional view of the L-shaped member of the tool taken along the line 4—4 in FIG. 1 and looking in the direction of the arrows;

FIG. 5 is a perspective view of part of an automobile windshield and frame illustrating the manner in which the tool is moved laterally to release successive spring clip fasteners and thereby remove the molding strips;

FIG. 6 is a sectional view, taken along the line 6—6 in FIG. 5 and looking in the direction of the arrows, illustrating in detail the manner in which a typical spring clip fastener engages the molding strip to hold it in place relative to the windshield of the automobile;

FIG. 7 is a sectional view, taken along the line 7—7 in FIG. 5 and looking in the direction of the arrows, illustrating the insertion of the tool between the frame and molding strip in solid lines and illustrating the operating position of the tool in dotted lines;

FIG. 8 is a sectional view, taken along the line 8—8 in FIG. 7 and looking in the direction of the arrows, illustrating the tool in its operative position with its tapered working edge adjacent to or in engagement with the inwardly extending edge of the molding strip;

FIG. 9 is a partial top plan view, with part of the molding strip broken away and in section, illustrating in detail the manner in which the tapered working edge of the tool is moved laterally to engage a spring clip fastener;

FIG. 10 is a view similar to FIG. 9 illustrating further lateral movement of the tool relative to the spring clip so that the tapered working edge of the tool has completely disengaged the spring clip and molding strip; and FIG. 11 is a cross sectional view, similar to that shown in FIG. 7, showing the tool in its operative position with the tapered working edge of the tool engaging a midportion of the spring clip to completely disengage it from the molding strip so that it is free to be removed.

Referring now specifically to the drawings, there is shown in FIGS. 1 to 4 a tool for removing molding strips from around the windshield of an automobile embodying the features of the present invention and generally designated by the reference numeral 10. The tool 10 is preferably formed from one piece of metal and includes a suitable gripping handle 12 having an L-shaped working tool 14 at one end thereof and an additional working tool 16 at the other end of handle 12. L-shaped member 14 includes a first section 18 connected to handle 12 at 18a. Section 18 is formed from a relatively thin strip of metal so that it may be inserted and wedged between the molding strip and window frame of the automobile, as will be explained in detail. In this illustrative embodiment, section 18 is relatively wide as the distance between edges 18b and 18c is slightly larger than the width of handle 12 and is wider than the conventional spring clip fastener.

L-shaped member 14 also includes a second section 20 which is connected to or integrally formed with section 18 at 20a at substantially right angles and which lies in a plane which is substantially perpendicular to the plane formed by section 18. As shown most clearly in FIG. 3, section 20 is provided with a working edge 22 formed at the tip thereof remote from section 18. Working edge 22 is substantially curved or arc-shaped and includes tapered side edges 22a, 22b which are symmetrical with respect to a central curved edge 22c. As will be explained, working edges 22a, 22b are tapered so that they may be slid under the spring clip fasteners from either direction to release them from the molding strips. Although in this illustrative form of the invention, handle 12 and sections 18 and 20 are integrally formed from a sheet of metal, such as steel, it should be understood that this invention is not limited to such a construction.

Turning now to FIG. 5, there is illustrated a partial view of an automobile 26, showing the roof 28, one side element 30 of the body, and a windshield 32, all constructed in accordance with known manufacturing procedures. As shown in FIG. 6, windshield 32 is mounted in a window frame formed by body elements 30, 34 and, in a conventional manner, a sealer such as a rubber strip 36 is provided to prevent water leakage around windshield 32. The joint between windshield 32 and the body element 30 is covered by molding strip 40 of suitable metal to provide an attractive trim around windshield 32. As is well known, molding strip 40 may be formed from a plurality of elements or from one continuous strip. For example, as shown in FIG. 5, molding strip 40 may include a vertical molding strip 42, an upper molding strip 44, with the corner joint being covered by a corner molding strip 46. Vertical molding strip 42 is shown partially removed in FIG. 5 in order to illustrate the lateral operation of the tool and location of fasteners 50 which are typical of those used in most automobiles. Typically, fasteners 50 are spaced around the edge of windshield 32 and, as illustrated in FIG. 6, are fastened to the automobile window frame 30 by means of suitable studs 52. The tool of the present invention will be illustrated and described with respect to a typical windshield and molding strip construction; however, it will be understood that the tool is not limited to use with such a construction, but may be used wherever similar structures are encountered.

As shown in FIG. 6, conventional spring clip fastener 50 is mounted on wall 30a of window frame 30, clip 50 being fastened into position by means of a stud 52. Clip 50 includes a mid-portion 56 and is formed with an outer lip or shoulder portion 54 which is adapted to engage the inwardly extending edge 60 of molding strip 40. Edge 60 of molding strip 40 depends from a wall portion 62 which is essentially parallel to window frame wall 30a. As clip fastener 50 is formed of spring metal, it is partially resilient so that molding strip 40 can be connected to window frame 30 by forcing edge 60 of the molding strip 40 against the outer portion of shoulder 54 of spring clip 50 to force it away from window frame 30a so that inwardly extending edge 60 may be forced below shoulder portion 54 to hold molding strip 40 in place with the other end of the molding strip engaging windshield 32 and holding it in place. Of course, it will be understood that other types of spring clip fasteners may be used with the tool of the present invention.

Spring clip fasteners 50, although relatively small, are made of a strong spring steel and are extremely difficult to release from molding strip 40 with the tools of the prior art. For example, the prior art tool disclosed in U.S. Pat. No. 3,751,785 consists of a blade and a curved tip portion. In operation, the curved tip portion is inserted between the molding strip and the window frame to a point below the inwardly extending edge 60 of molding strip 40 so that it may engage spring clip 50. The arcuate tip portion is intended to then function as a fulcrum contacting the window frame 30a with the handle of the tool extending outwardly over the molding and generally parallel to windshield 32. The tool must then be pivoted about the arcuate tip portion or fulcrum so that the terminal end of the tool will engage and urge the spring clip fasteners 50 away from the window frame 30a. However, the aforesaid tool described in U.S. Pat. No. 3,751,785 does not function to release the fasteners from the molding strip. More particularly, when the prior art tool is pivoted about the arcuate tip portion or fulcrum, it does not operate to release shoulder portion 54 of spring clip fastener 50 from the inwardly extending edge 60 of molding strip 40. Apparently, the prior art tool cannot be pivoted sufficiently to disengage the spring clip from the molding strip. In addition, to the extent that the prior art tool can be pivoted, the arcuate tip portion or fulcrum operates to move the molding strip and the fastener together and does not operate to disengage the two elements.

To overcome these difficulties, and to permit easy, quick and safe removal of molding strips, the tool of the present invention was devised. Tool 10, illustrated in FIGS. 1 to 4, operates as shown by the arrow 68 in FIG. 5 to remove molding strip 40 in a continuous operation with the tool 10 sliding laterally along the axis of the molding strip. With the tool of the present invention, it is not necessary to determine the location of each of the spring clip fasteners 50 before they may be released from the molding strip, as in the prior art. With the tool of the present invention, it is simply necessary to insert section 20 of the tool between window frame 30a and molding strip 40, pivot it approximately 90° into its operating position, and slide it laterally relative to the molding strip and window frame. This lateral movement of tool 10 operates to disengage spring clip fasteners 50 from molding strip 40 so that its components 42, 44 and 46 may be released from successive spring clip fasteners 50 in one continuous operation.

Turning now to FIGS. 7 through 11 of the drawings, the operation of the tool of the present invention is illustrated in detail. More particularly, as shown in FIG. 7, section 20 of the tool is first inserted between wall 62 of molding 40 and wall 30a of window frame 30. As spring clip 50 is resilient, it moves away from window frame 30a sufficiently to allow for the insertion of section 20 of the tool. The insertion position of the tool is shown in solid lines in FIG. 7 and, as indicated by arrows 70, tool 10 is then pivoted approximately 90° from the solid line insertion position to the dotted line operating position shown in FIG. 7. When tool 10 is in the operating position shown in FIG. 7, section 18 is essentially parallel to window frame wall 30a and is between window frame wall 30a and wall portion 62 of molding strip 40. Section 20 of the tool, however, as shown by dotted lines in FIG. 7, is essentially perpendicular to window frame wall 30a and is substantially parallel to the inwardly extending edge 60 of molding strip 40.

As shown in FIG. 8, once the tool has been inserted between window frame 30 and molding strip 40 and has been pivoted to its operating position, the tool is then ready to be slid laterally in the direction of the axis of the molding strip 40, as shown by arrow 72. As may be seen most clearly in FIG. 8, tapered working edge 22 of section 20 of the tool is held closely adjacent to or in engagement with the inwardly extending edge 60 of molding strip 40. In other words, as the operator slides the tool laterally in the direction of arrow 72, a slight outward or pulling force should be exerted on the tool to insure that working edge 22 is held closely adjacent to or in engagement with inwardly extending edge 60. In this manner, as the tool is slid laterally, working edge 22 will not engage stud 52 and interrupt its continuous lateral movement.

As shown most clearly in FIG. 9, as tool 10 is moved laterally in the direction of arrow 74, tapered working edge 22a of tool section 20 will first engage spring clip fastener 50 at mid-portion 56. Continued lateral movement of tapered edge 22a, 22c relative to mid-portion 56 of spring clip 50 will gradually force shoulder 54 further and further away from window frame wall 30a and out of engagement with inwardly extending edge 60 of molding strip 40. As shown in FIG. 10, as the lateral movement of tool section 20 continues, the central portion 22c of working edge 22 will gradually be worked into engagement with mid-portion 56 of spring clip 50 so that shoulder portion 54 of spring clip 50 will be completely out of engagement with the inwardly extending edge 60 of molding strip 40. A sectional view clearly illustrating this position of the tool in which the central curved portion 22c of working edge 22 is in engagement with mid-portion 56 of spring clip 50 is shown in FIG 11. Once spring clip fastener 50 is disengaged from molding strip 40, molding strip 40 is released and is moved out of engagement with windshield 32 allowing molding strip 40 to be removed.

Accordingly, as shown in FIG. 5, as tool 10 continues to be slid laterally in the direction of arrow 68, it will successively release spring clip fasteners 50', 50'', etc. in the same manner as spring clip 50 was released. Of course, as working edge 22 is provided with symmetrical tapered working edges 22a, 22b on either side of the tool, it will be apparent that tool 10 may be operated in either lateral direction to release the fasteners. In addition, working tool 16 may be of any type, but in this illustrative form of the invention, working tool 16 is provided with a sharp edge 16a for cutting the glue or other sealer between molding strip 40 and window frame 30, before the other end 14 of the tool is inserted.

From the foregoing, it will be appreciated that there is provided in accordance with the present invention, a tool for removing molding strips from around the windshield of an automobile in an easy, quick and safe manner. The tool may be operated in a continuous manner to release successive spaced fasteners from the molding strip as the tool is moved continuously and without interruption in a lateral direction relative to the molding strip. In addition, with the tool of the present invention, there is no need to first locate each of the spaced fasteners before they may be released and there is no possibility of damaging the molding strips, the windshield or the spring clips during such removal.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. A tool for removing a molding strip from around the windshield of an automobile, said molding strip being attached to the frame surrounding said windshield by means of a plurality of spaced fasteners, said tool comprising a handle, an L-shaped member having first and second sections, said first section being connected to one end of said handle and lying in a first plane at an angle with the longitudinal axis of said handle, said second section being connected to said first section at substantially right angles and lying in a second plane substantially perpendicular to said first plane and extending toward the longitudinal axis of said handle, said second section having a working edge formed at the terminal end thereof remote from said first section, and said working edge being shaped for engaging said sliding relative to said fasteners to force said fasteners away from said frame and thereby disengage said fasteners and said molding strip so that said molding strip may be removed, said working edge including a central curved edge and said edges, all lying in said second plane, said side edges forming a continuous taper from said curved edge to the juncture of said first and second sections.

2. A tool in accordance with claim 1 wherein said first section is of a length sufficient to extend between said frame and said molding strip so that the working edge of said second section may engage said fastener as it is moved laterally in the direction of the molding strip.

3. A tool in accordance with claim 1 wherein said tapered working edge is substantially arc-shaped so that it may slide between said fastener and said frame, and successively force said fastener further away from said frame until said fastener is out of engagement with said molding strip.

4. A tool in accordance with claim 1 wherein said handle is provided with a tool head at the other end thereof.

* * * * *